(12) United States Patent
Pai

(10) Patent No.: US 7,987,250 B2
(45) Date of Patent: Jul. 26, 2011

(54) MAXIMUM CLIQUE IN A GRAPH

(75) Inventor: Ramachandra N. Pai, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1100 days.

(21) Appl. No.: 10/630,037

(22) Filed: Jul. 30, 2003

(65) Prior Publication Data

US 2005/0027780 A1 Feb. 3, 2005

(51) Int. Cl.
G06F 15/173 (2006.01)
(52) U.S. Cl. .................... 709/223; 370/254; 370/255
(58) Field of Classification Search .............. 709/223; 370/254, 255
See application file for complete search history.

(56) References Cited

U.S. PATENT DOCUMENTS

| | | | | |
|---|---|---|---|---|
| 4,821,157 A * | 4/1989 | Birk et al. | | 362/241 |
| 5,446,908 A * | 8/1995 | Kevorkian | | 710/240 |
| 5,515,383 A * | 5/1996 | Katoozi | | 714/732 |
| 5,655,137 A * | 8/1997 | Kevorkian | | 712/17 |
| 5,884,018 A * | 3/1999 | Jardine et al. | | 714/4 |
| 6,002,851 A * | 12/1999 | Basavaiah et al. | | 714/4 |
| 6,240,463 B1 * | 5/2001 | Benmohamed et al. | | 709/238 |
| 6,327,387 B1 * | 12/2001 | Naoi et al. | | 382/190 |
| 6,374,297 B1 * | 4/2002 | Wolf et al. | | 709/226 |
| 6,437,804 B1 * | 8/2002 | Ibe et al. | | 715/736 |
| 6,449,743 B1 * | 9/2002 | Hosokawa | | 714/738 |
| 6,594,624 B1 * | 7/2003 | Curet | | 703/2 |
| 6,795,399 B1 * | 9/2004 | Benmohamed et al. | | 370/235 |
| 6,990,080 B2 * | 1/2006 | Bahl et al. | | 370/254 |
| 7,512,703 B2 * | 3/2009 | Ho et al. | | 709/238 |
| 2003/0026268 A1 * | 2/2003 | Navas | | 370/400 |
| 2004/0151121 A1 * | 8/2004 | Natarajan et al. | | 370/252 |
| 2004/0156321 A1 * | 8/2004 | Walker et al. | | 370/254 |

OTHER PUBLICATIONS

Ostergard, P.R.J, "A Fast Algorithm for the Maximum Clique Problem," Discrete Applied Mathematics, vol. 120, pp. 197-207, 2002.*
Pardalos et al, "An Exact Parallel Algorithm for the Maximum Clique Problem," High performance algorithms and software in nonlinear optimization. Kluwer Academic Publishers, 1998.*
V. Bouchitte et al, "Listing all potential maximal cliques of a graph," Lecture Notes in Computer Science—Proceedings of teh 17th Annual Symposium on Theoretical Aspects of Computer Science, vol. 1770, pp. 503-515, 2000.*

(Continued)

*Primary Examiner* — Dohm Chankong
(74) *Attorney, Agent, or Firm* — Lieberman & Brandsdorfer, LLC

(57) ABSTRACT

A method and system for maximizing connectivity within members of a group, or for example a clique, in polynomial time. Vertices representing inter-connectivity of each member are placed on a graph in descending order. Least connected members are systematically removed from the graph until the connectivity count of a least connected vertex is equal to a quantity of vertices remaining in the graph. Following the removal of a vertex from the graph, an update of the inter-connectivity of each member on the graph is performed. Accordingly, when the connectivity count of a least connected vertex is equal to a quantity of vertices remaining in the graph a clique with maximum inter-connectivity has been achieved.

11 Claims, 2 Drawing Sheets

OTHER PUBLICATIONS

Coudert, Olivier, "Exact Coloring of Real-Life Graphs is Easy," Annual ACM IEEE Design Automation Conference, pp. 121-126, 1997.*

Jagota, Arun, "Optimization by reduction to maximum clique," IEEE International Conference on Neural Networks, vol. 3, pp. 1526-1531, 1993.*

Szymanski, et al, "Spanning tree algorithm for spare network capacity," Canadian Conference on Electrical and Computer Engineering, vol. 1., pp. 447-452, 2001.*

Bomze et al, "The Maximum Clique Problem," Handbook of Combinatorial Optimization, pp. 1-74, Kluwer Academic Publishers, 1999.*

J. Abello, M. G. C. Resende, and S. Sudarsky. Massive quasi-clique detection. Latin: Latin American Symposium on Theoretical Informatics, 2286:598-612, 2002.*

Pardalos et al., "The maximum clique problem", Journal of Global Optimization, pp. 301-328, 1994.*

* cited by examiner

MAXIMUM CLIQUE IN A GRAPH

BACKGROUND OF THE INVENTION

1. Technical Field

This invention relates to a method and system for maximizing connectivity between each node among a grouping of nodes in a network computing environment through maximizing connectivity for each member of a clique in a graph. More specifically, the invention relates to systematic removal of vertices in a graph that have an inefficient connectivity count.

2. Description of the Prior Art

A connectivity count is a mathematical relationship illustrating interconnections between objects in a group. In a computing environment, connectivity between server nodes in a cluster enhances communication and operating efficiency of the cluster. Total connectivity among nodes is obtained when each node in a grouping of nodes is connected to each other node in the grouping. This grouping is known as a clique. In order to maintain an efficient operating cluster, it may be desirable to remove a node from the cluster that it not completely connected to each other node in the cluster.

There are several known methods for determining connectivity among nodes in a cluster. One known method is to determine connectivity through a build approach. FIG. 1 is a flow chart (10) illustrating a generic build approach algorithm. The process is initiated with computing a connectivity count of all the vertices in the graph (12). Thereafter, the vertices in the graph are sorted (14), and a clique set within the graph is initialized as a null set (16). A test is subsequently conducted to determine if the graph is empty (18). If the result of the test at step (18) is positive, the clique is returned (20). However, if the result of the test at step (18) is negative, the vertex with the highest connectivity is selected and removed from the graph (22). Thereafter, another test is conducted to determine if the removed vertex is connected with all of the vertices in the graph (24). A positive response to the test at step (24), will result in adding the vertex to the graph (26), followed by a return to step (18). Alternatively, a negative response to the test at step (24), will result in a return to step (18). The build algorithm, as demonstrated in FIG. 1, is initiated with an empty list of nodes. A first node is selected, and a search is conducted to determine which other nodes are connected to the first node selected. This approach is continued for each node in the cluster. A graph is built based upon the connectivity data collected for each node, thereby allowing the operator to determine connectivity for each node in the computing environment. The build approach iteratively adds nodes to build a clique with maximum connectivity among the nodes. One limitation associated with the build approach is the time constraint of determining connectivity for each node in the cluster on an individual basis. Accordingly, the build approach is a deferred algorithm for determining connectivity among nodes in a cluster.

There is therefore a need for an efficient method and system to determine connectivity among peer nodes in a cluster.

SUMMARY OF THE INVENTION

This invention comprises a method and system for efficiently determining connectivity among vertices in a graph.

In a first aspect of the invention, a method is provided for maximizing group membership. A connectivity count of each vertex in a graph is calculated, and a maximum connectivity count for each vertex is determined based upon the calculation. A vertex with a connectivity count less than the maximum connectivity count is removed from the graph.

In a second aspect of the invention, a system is provided to determine a maximum group membership. A counter is provided for calculating a connnectivity count for each vertex in a graph. Means are provided for placement of each vertex in descending order of connectivity, and means are provided for removal of a vertex from the graph with a connectivity count less than a maximum connectivity count.

In a third aspect of the invention, an article is provided with a computer-readable recordable data storage medium. Means in the medium are provided for calculating connectivity for each vertex in a graph. In addition, means in the medium are provided for selecting a least connected vertex in a clique in the graph, and for removing the least connected vertex from the graph.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

In a multi-node computing environment, inter-connectivity among nodes in a cluster enhances coordination of communication with other nodes in the environment. Maximum connectivity is achieved when two-way communication exists between each node in the cluster. Each node in the cluster is mapped on a graph illustrating the number of vertices associated with each node, wherein each vertex is representative of the number of nodes in the cluster to which each node is connected. Vertices which are not in communication with each vertex in the graph are eliminated in an expedited manner. Accordingly, the process of eliminating least connected vertices results in an efficient algorithm for returning a maximum clique of vertices.

Technical Details

Figure 1:
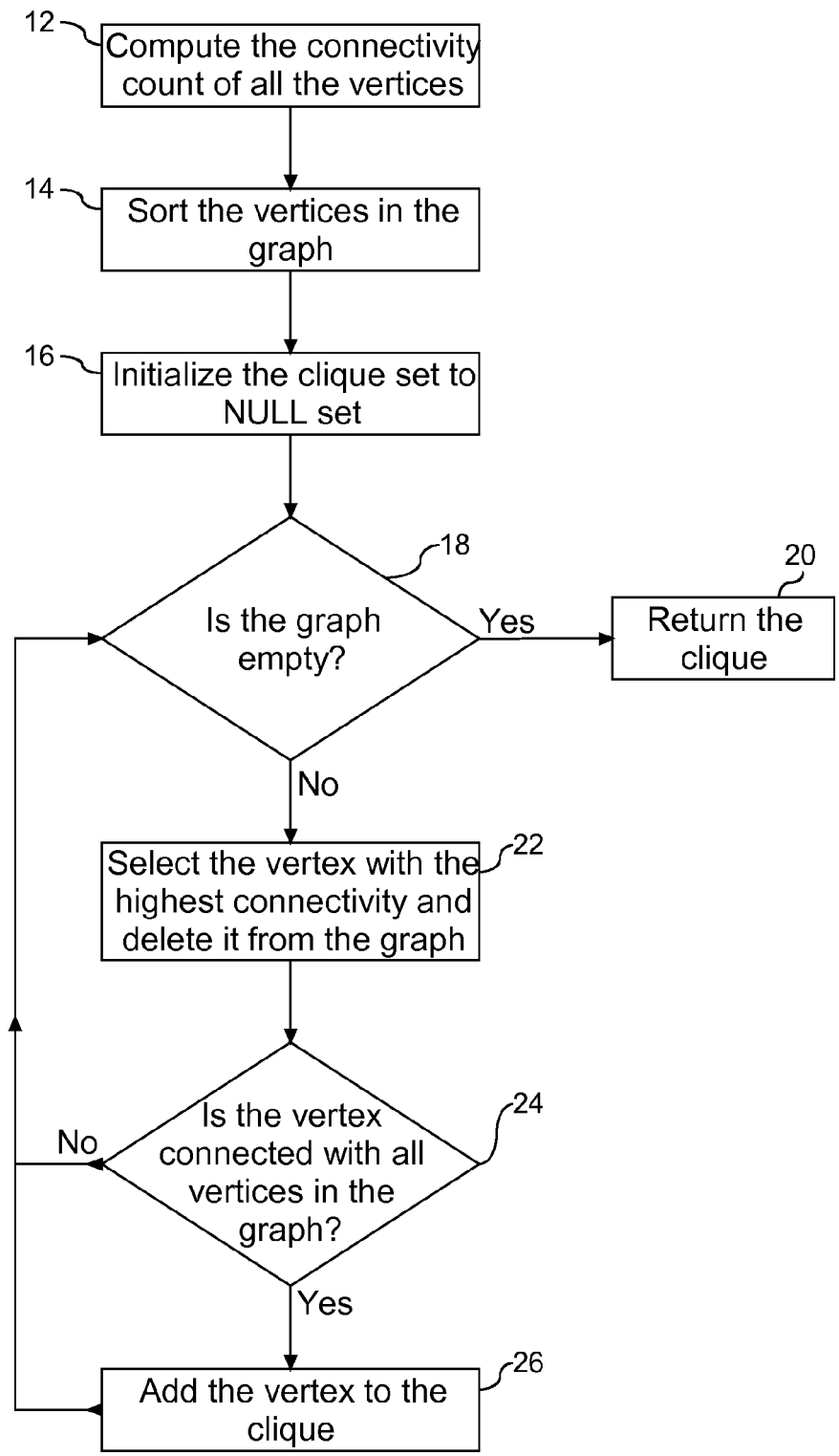
FIG. 1 is a prior art flow diagram for achieving maximum connectivity.
Figure 2:
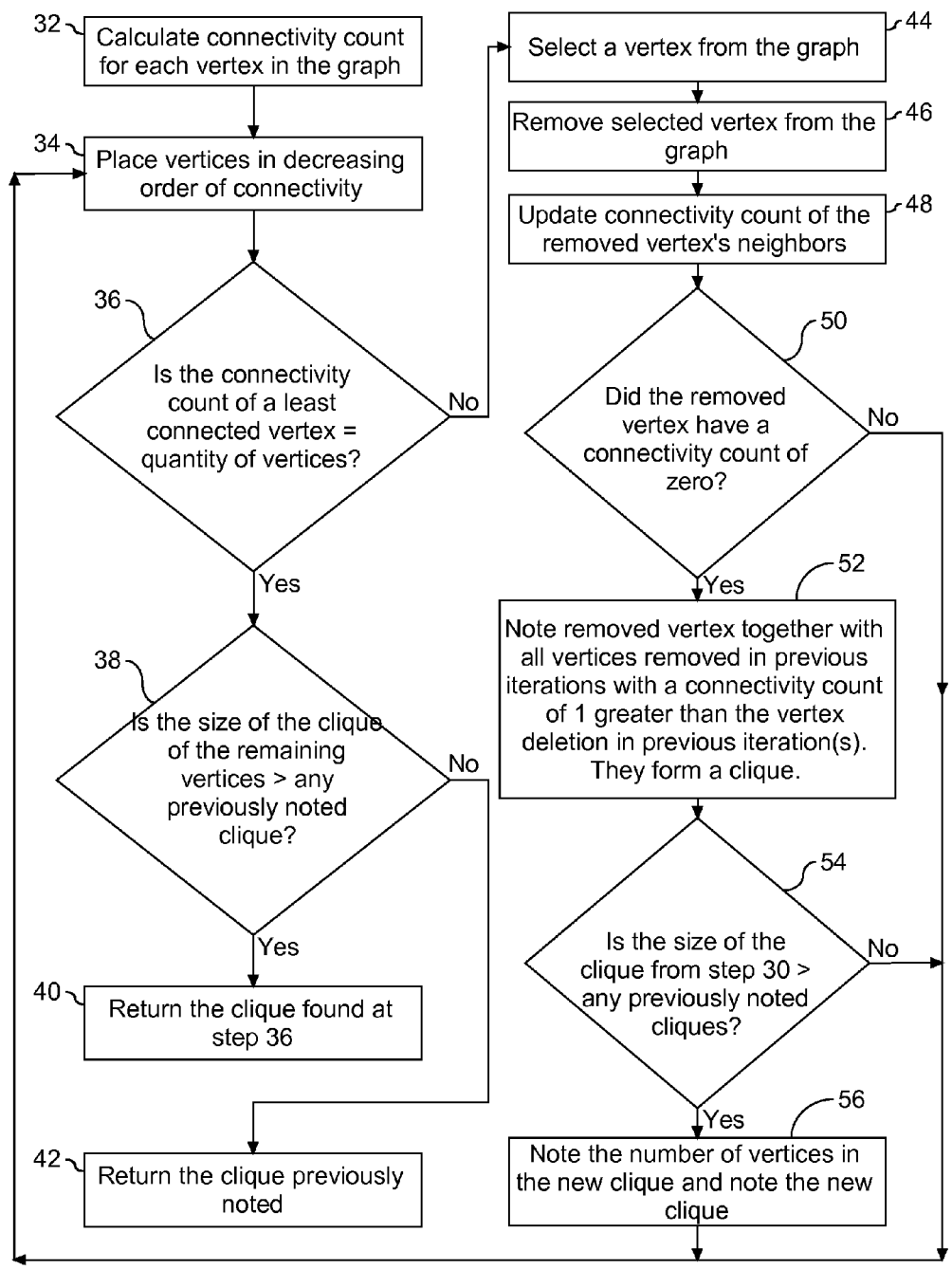
FIG. 2 is a flow diagram of an algorithm for achieving maximum connectivity according to the preferred embodiment of this invention, and is suggested for printing on the first page of the issued patent.

FIG. 2 is a flow diagram (30) illustrating the process of removal of vertices from a graph. The first step in the process is to calculate a connectivity count for each vertex in the graph (32). A connectivity count is a mathematical relationship illustrating interconnections between vertices. Following the step of calculating a connectivity count, each of the vertices of the graph is placed in decreasing order of connectivity (34). This placement process is a component that is required for the subsequent selection process. Thereafter, a test is conducted to determine if the connectivity count of a least connected vertex is equal to the quantity of vertices in the graph (36). A positive response to the test at step (36) is an indication that a maximum clique may have been found. Thereafter, a subsequent test is conducted to determine if the remaining vertices in the graph form a clique, and if the size of the clique is larger than any previously noted clique (38). A positive response to the test at step (38) will return the clique found at step 36 with the maximum number of vertices in the graph (40). A negative response to the test at step (38) will return a previously noted clique (42). For example, a return of a clique within a multi-node computing system at step (42) signifies a clique of interconnected nodes that is smaller than a previously noted clique. Accordingly, when the connectivity count of the least connected vertex is equal to the number of vertices on the graph this may be an indication that a clique of vertices with maximum connectivity has been achieved.

If at step (36), it is determined that the connectivity count of the least connected vertex is not equal to the number of vertices in the graph, a selection of a vertex from the graph among the least connected vertices is conducted such that the sum of the connectivity count is the least among the vertices in the graph (44). If there is more than one vertex of the least connected vertices with the same connectivity count, the algorithm will select the vertex which when removed will affect the connectivity of the least connected vertices. The selected vertex is removed from the graph (46). Following removal of the selected vertex at step (46), an update of the connectivity count of all of the removed vertex's neighbors is conducted (48). Thereafter, a test is conducted to determine if the removed vertex had a connectivity count of zero prior to deletion from the graph (50). If no other vertex in the graph was connected to the removed vertex, this is an implication that the removed vertex was part of a clique of vertices previously removed. A negative response to the test at step (50) will return to step (34) for placement of the remaining vertices of the graph in descending order of their connectivity. Alternatively, a positive response to the test at step (50) will require a notation of the vertex removed at step (46) together with all of the vertices that were removed from the graph in previous iterations whose connectivity count at the time of deletion was one more than the vertex removed in the previous iteration (52). All of the vertices in this notation at step (52) form a clique. The size of this clique is noted. Thereafter, a test is conducted to determine if the size of the clique is larger than any previously noted cliques of vertices (54). A negative response to the test at step (54) will result in a return to step (34). However, a positive response to the test at step (54) will result in a notation of the number of vertices in the new clique and the new clique, and erasing the information pertaining to the previous clique (56), followed by a return to step (34). Accordingly, if the connectivity count of the least connected vertex is not equal to the number of vertices in the graph, this vertex is eliminated from the graph.

Vertices in a clique get eliminated from the graph in consecutive iterations. The connectivity count of the vertex at the time of elimination is always one less than it's clique neighbor that was eliminated in the previous iteration. In a systematic and efficient manner, a clique with maximum connectivity is determined. Accordingly, the algorithm proceeds in an accelerated manner to achieve maximum inter-connectivity among vertices in a graph.

Advantages Over The Prior Art

The algorithm disclosed herein analytically solves a geometric clique problem in polynomial time. Vertices in the graph are eliminated from the graph on an individual basis until a completely inter-connected clique of vertices remains. The efficiency of the algorithm allows for a return of a maximum clique of vertices in an expeditious manner.

Alternative Embodiments

It will be appreciated that, although specific embodiments of the invention have been described herein for purposes of illustration, various modifications may be made without departing from the spirit and scope of the invention. In particular, the vertices of the graph should not be limited to server nodes in a computer system. Rather the vertices of the graph may represent components on an electronic circuit board wherein each node in the graph represents a component, and an edge represents two nodes that are physically too close to be checked simultaneously. A clique in this graph is then a set of components that can be checked in one pass. Another example of application of the algorithm is for use in pattern recognition. Given a target picture and an input picture (which may involve only a set of points), a related compatibility graph is created whose vertices correspond to pairs of points. There is an edge between two vertices if the corresponding pairs are mutually consistent, where this can depend on a variety of restrictions, including angular relationships as well as the requirement that no point be matched with more than one other. A large clique represents a large number of mutually consistent pairs, and its size can be used as a measure of the corresponding fit. Another example of an application of the algorithm is for use with analysis of biological and archeological data. In biology and archeology, a standard model for relating objects is that of a tree representing the division of a species into two separate species or the division of features of some artifact. A graph may be created wherein the nodes of the graph represent partitions of items. A clique in this graph may represent a set of partitions that can be formed into a tree. Maximum cliques attempt to encapsulate as much of the partition data as possible. Other application of the maximum clique algorithm include project selection, classification, fault tolerance, coding, computer vision, economics, information retrieval, signal transmission, alignment of DNA with protein sequences, and any system where maximum inter-connectivity of all elements in a set is desired. Accordingly, the scope of protection of this invention is limited only by the following claims and their equivalents.

I claim:

1. A method for maximizing group membership comprising:
    updating by a processor a connectivity count of each vertex in a graph after removing one vertex from said graph, wherein the connectivity count of a vertex is a number of neighbors connected to the vertex, said connectivity count stored in said memory;
    selecting by said processor a vertex with a least sum of connectivity counts of all its neighboring vertices from among all vertices having a same least connectivity count;
    removing by said processor said selected vertex from the graph;
    returning by said processor a grouping of interconnected vertices forming a clique when each vertex in said grouping is connected to each other vertex in said grouping;
    for a determination of said removed vertex having a connectivity count equaling zero, said processor returning a grouping consisting of the removed vertex with a connectivity count equaling zero and all its neighboring vertices, said neighboring vertices including any vertex removed in any previous iteration of the selecting and removing steps, said grouping forming a current eliminated clique;
    comparing by said processor a number of vertices in said current eliminated clique with a number of vertices in each previously eliminated and stored clique; and storing by said processor the current eliminated clique in said memory if the current eliminated clique has a size greater than a size of any of previously eliminated and stored clique.

2. The method of claim 1, wherein each vertex represents a node of a computer cluster and the clique forms an efficient operating cluster.

3. The method of claim 1, wherein the step of removing each selected vertex from the graph continuous until the clique of completely interconnected vertices is formed.

4. A system to determine a maximum group membership comprising:
- a processor in communication with a memory containing information about vertices in a graph including a connectivity count;
- the graph with at least two vertices;
- a counter to calculate the connectivity count for each vertex in the graph, wherein the connectivity count of a vertex is a number of neighbors connected to the vertex;
- said processor to place each vertex in descending order of connectivity based on said calculated connectivity count;
- said processor to select a vertex with a least sum of connectivity counts of all its neighboring vertices from among all vertices with a same least connectivity count;
- said processor to remove said selected vertex from the graph;
- said memory to store a clique of completely interconnected vertices formed, wherein each vertex in the clique is connected to each other vertex in the clique;
- said processor to form a grouping consisting of a removed vertex with a connectivity count equaling zero and all its neighboring vertices previously removed from the graph based upon their connectivity counts and the connectivity counts of their neighbors, said neighboring vertices including any vertex removed in any previous iteration of the selection and removal by the processor, said grouping presenting a current eliminated clique;
- said processor to perform a comparison between a number of vertices in said current eliminated clique with a number of vertices in each previously eliminated and stored clique; and
- said memory to store a record for the current eliminated clique if the current eliminated clique has a size greater than a size of any of previously eliminated and stored clique.

5. The system of claim 4, wherein each vertex represents a node of a computer cluster and the clique forms an efficient operating cluster.

6. The system of claim 4, wherein removal of a vertex from said graph with said connectivity count is continuous until the clique of completely interconnected vertices is formed.

7. The system of claim 4, further comprising said processor determining a maximum clique in said graph by comparing the number of completely interconnected vertices left in the graph with the number of vertices in each of the stored eliminated cliques.

8. An article comprising:
- a computer-readable recordable data storage medium;
- a processor in communication with memory containing information about vertices in a graph including a connectivity count;
- means in the medium for updating the connectivity for each vertex in the graph, the connectivity count of a vertex is a number of neighbors connected to the vertex;
- means in the medium for placing vertices in decreasing order of connectivity based upon said calculated connectivity count of each vertex in said graph;
- means in the medium for selecting a vertex with a least sum of connectivity counts of all its neighboring vertices from among all vertices having a same least connectivity count;
- means in the medium for removing said selected vertex from the graph;
- means in the medium for forming a clique of completely interconnected vertices, wherein each vertex in the clique is connected to each other vertex in the clique;
- means in the medium for returning a grouping consisting of a removed vertex with a connectivity count equaling zero and all its neighboring vertices, said neighboring vertices including any vertex previously removed in any previous selection and removal, said grouping forming a current eliminated clique;
- means in the medium for comparing a number of vertices in said current eliminated clique with a number of vertices in each of previously eliminated and stored clique; and
- means in the medium for storing the current eliminated clique if the current eliminated clique has the size greater than the size of any of previously eliminated and stored clique.

9. The article of claim 8, wherein said means for removing a least connected vertex for removal from a clique in said graph includes comparing a connectivity count of said least connected vertex with a number of remaining vertices in the graph.

10. The article of claim 8, wherein each vertex represents a node of a computer cluster and the clique forms an efficient operating cluster.

11. The article of claim 8, further comprising means in the medium for determining a maximum clique in said graph by comparing the number of completely interconnected vertices left in the graph with the number of vertices in each of the stored eliminated cliques.

* * * * *